US009567422B2

(12) United States Patent
Webster et al.

(10) Patent No.: US 9,567,422 B2
(45) Date of Patent: Feb. 14, 2017

(54) ACETOACETOXY AND ENAMINE COMPOUNDS AND COATINGS THEREFROM (75) Inventors: Dean C. Webster, Fargo, ND (US); Thomas J. Nelson, Fargo, ND (US); Xiao Pan, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 955 days.

(21) Appl. No.: 13/577,039

(22) PCT Filed: Feb. 4, 2011

(86) PCT No.: PCT/US2011/023790
§ 371 (c)(1),
(2), (4) Date: Oct. 16, 2012

(87) PCT Pub. No.: WO2011/097512
PCT Pub. Date: Aug. 11, 2011

(65) Prior Publication Data
US 2013/0036939 A1  Feb. 14, 2013

Related U.S. Application Data (60) Provisional application No. 61/302,119, filed on Feb. 6, 2010.

(51) Int. Cl.
*C07C 229/30*  (2006.01)
*C07H 15/04*  (2006.01)
(Continued)

(52) U.S. Cl.
CPC .............. *C08G 16/0212* (2013.01); *C08G 2/12* (2013.01); *C08G 12/06* (2013.01); *C09D 161/00* (2013.01)

(58) Field of Classification Search
None
See application file for complete search history.

(56) References Cited

U.S. PATENT DOCUMENTS 3,897,377 A * 7/1975 Broecker et al. ............ 528/74.5
5,688,860 A  11/1997 Croft
(Continued)

FOREIGN PATENT DOCUMENTS

WO  2011/097512 A1  8/2011

OTHER PUBLICATIONS

Search Report and Written Opinion for PCT International Application No. PCT/US2011/023790, dated Mar. 23, 2011.

*Primary Examiner* — Jeffrey Washville
(74) *Attorney, Agent, or Firm* — J. A. Lindeman & Co., PLLC (57) ABSTRACT

The invention relates to enamine resins which are the reaction products of a) an acetoacetylated resin, and a $C_1$-$C_{20}$ alkyl amine or a mixture of $C_1$-$C_{20}$ alkyl amines. The acetoacetylated resin is the reaction product of a polyol having 4 or more hydroxyl groups; and at least one acetoacetate. The invention also relates to an acetoacetylated resin which is the reaction product of a polyol having 4 or more hydroxyl groups and at least one acetoacetate, where a portion of the hydroxyl groups of the polyol are replaced by acetoacetate groups and the remaining hydroxyl groups are replaced by a saturated monofunctional carboxylic acid ester, unsaturated monofunctional carboxylic acid ester, or a mixture thereof; as well as to enamine resins prepared from these acetoacetylated resins. The invention also relates to curable coating compositions containing such resins or a mixture of those resins, at least one metallic drier compound; and optionally one or more solvents.

20 Claims, 8 Drawing Sheets (51) Int. Cl.
*C09D 105/00* (2006.01)
*C08G 16/02* (2006.01)
*C08G 2/12* (2006.01)
*C08G 12/06* (2006.01)
*C09D 161/00* (2006.01)

(56) References Cited

U.S. PATENT DOCUMENTS

| | | |
|---|---|---|
| 6,203,607 B1 * | 3/2001 | Schoonderwoerd et al. .................... 106/287.11 |
| 6,573,321 B2 | 6/2003 | Karuga et al. |
| 6,683,132 B1 | 1/2004 | Schick et al. |
| 2007/0173602 A1 * | 7/2007 | Brinkman ......... C08F 222/1006 524/592 |

* cited by examiner

ACETOACETOXY AND ENAMINE COMPOUNDS AND COATINGS THEREFROM

CROSS-REFERENCE TO RELATED APPLICATIONS

This application claims priority to PCT International Application No. PCT/US2011/023790, filed Feb. 4, 2011; which claims priority to U.S. Application 61/302,119, filed Feb. 6, 2010, which is incorporated herein by reference.

STATEMENT OF GOVERNMENT SUPPORT

This invention was made with government support under grant no. 2007-38202-18597 awarded by the US Department of Agriculture (USDA). The US Government has certain rights in the invention.

BACKGROUND

The contribution of chemistry industry to 'Sustainable Development' was demonstrated by the utilization of renewable raw materials, (Meier, et al., *Chem. Soc. Rev.*, 2007, 36, 1788-1802; Baumann, et al., *Angew. Chem. Int. Ed. Engl.* 1998, 27, 41-62; Biermann, et al., *Angew. Chem. Int. Ed.* 2000, 39, 2206-2224; and Khot, et al., *Journal of Applied polymer Science*, 2001, 82, 703-723.), such as polysaccharides, natural oils and fats, etc. In coating science, drying oils, which are naturally occurring triglycerides of unsaturated fatty acids, have been used in the formulation of coating resins for centuries. Currently, some innovative design strategies in this area were employed such as the fatty acids reacted with hyperbranched polyols (Bat, et al., *Progress in Organic Coatings*, 2006, 55, 330-336; Mańczyk, et al., *Progress in Organic Coatings*, 2002, 44, 99-109; Karakaya, et al., *Progress in Organic Coatings*, 2007, 59, 265-273; and Haseebuddin, et al., *Progress in Organic Coatings*, 2009, 64, 446-453) (i.e. di-pentaerythritol, tri-pentaerythritol or derivatives) to obtain high solids alkyd resins, based on concepts of structure-property relationships.

Sucrose is a naturally occurring raw material having eight hydroxyl groups, which potentially can be attached by eight fatty acids to yield the desired well-defined compact ester structure. Sucrose esters of unsaturated fatty acids (SEUFA) were explored as coating vehicles in the 1960s. Bobalek, et al., *Official Digest*, 1961, April, 453-468; and Walsh, et al., *Div. Org. Coatings Plastic Chem.*, 1961, 21, 125-148. These early studies also indicated that the highly substituted SEUFA had a uniform fatty acid distribution, low viscosity, rapid air-drying time and good coating properties. Procter & Gamble developed an efficient industrial process for SEUFA synthesis that yields complete substitution of all eight hydroxyls on sucrose. U.S. Pat. Nos. 6,995,232; 6,620,952; and 6,887,947.

To build up better polyester/alkyd resins, acetoacetates have been used because of their attractive attributes, such as low glass transition temperature, high solid content, and selective crosslinking options. Kuo et al., (U.S. Pat. Nos. 6,794,049 and 6,780,523), disclosed both high solids solventborne and waterborne air curable coating compositions based on acetoacetate-functional alkyd resins, prepared by transesterification reaction. Bors et al., (U.S. Pat. No. 5,484,849), disclosed an air curing polymer with pendant acetoacetate functional groups, prepared by free radical polymerization (emulsion polymerization). The acetoacetate functionalized alkyds, in combination with at least one drier, cured faster than the original alkyds in air-drying process, without the evidence of reaction mechanism. As the other options, acetoacetate functionalized resins can be cured by enamine formation (Trevino, et al., *Progress in Organic Coatings*, 2002, 44, 49-54; Esser, et al., *Progress in Organic Coatings*, 1999, 36, 45-52; Geurink, et al., *Progress in Organic Coatings*, 1996, 27, 73-78; and Geurink, et al., *Progress in Organic Coatings*, 2003, 48, 153-160) with multifunctional amines, Michael addition with acrylates (Vogt-Birnbrich, *Progress in Organic Coatings*, 1996, 29, 31-38; and Pieschmann, et al., *Progress in Organic Coatings*, 1999, 36, 64-69), and reaction with aldehyde, (Pieschmann, et al., *Progress in Organic Coatings*, 1999, 36, 64-69).

SUMMARY OF THE INVENTION

The invention relates to enamine resins which are the reaction products of a) an acetoacetylated resin, and a $C_1$-$C_{20}$ alkyl amine or a mixture of $C_1$-$C_{20}$ alkyl amines. The acetoacetylated resin is the reaction product of a polyol having 4 or more hydroxyl groups; and at least one acetoacetate. The invention also relates to an acetoacetylated resin which is the reaction product of a polyol having 4 or more hydroxyl groups and at least one acetoacetate, where a portion of the hydroxyl groups of the polyol are replaced by acetoacetate groups and the remaining hydroxyl groups are replaced by a saturated monofunctional carboxylic acid ester, unsaturated monofunctional carboxylic acid ester, or a mixture thereof; as well as to enamine resins prepared from these acetoacetylated resins.

The invention also relates to curable coating compositions which may be formulated with or without solvents. A curable coating composition of the invention contains a resin such as those discussed above or a mixture of those resins, at least one metallic drier compound; and optionally one or more solvents.

DESCRIPTION OF THE INVENTION

The invention relates to enamine resins which are the reaction products of a) an acetoacetylated resin, and a $C_1$-$C_{20}$ alkyl amine or a mixture of $C_1$-$C_{20}$ alkyl amines. The acetoacetylated resin is the reaction product of a polyol having 4 or more hydroxyl groups; and at least one acetoacetate. The invention also relates to an acetoacetylated resin which is the reaction product of a polyol having 4 or more hydroxyl groups and at least one acetoacetate, where a portion of the hydroxyl groups of the polyol are replaced by acetoacetate groups and the remaining hydroxyl groups are replaced by a saturated monofunctional carboxylic acid ester, unsaturated monofunctional carboxylic acid ester, or a mixture thereof; as well as to enamine resins prepared from these acetoacetylated resins.

Acetoacetylated Resins

The esterification of a polyol having 4 or more hydroxyl groups to form acetoacetylated polyols is known in the art and has been described in U.S. Pat. No. 4,551,523, which is incorporated here by reference. A convenient way to introduce acetoacetate groups to a polyol is by transesterification with t-butyl acetoacetate, tBAA. Polyols having 4 or more hydroxyl groups which may be used in the resins of this invention include, but are not limited to, pentaerythritol, di-trimethylolpropane, di-pentaerythritol, tri-pentaerythritol, sucrose, glucose, mannose, fructose, galactose, raffinose, copolymers of styrene and allyl alcohol, polyglycidol and poly(dimethylpropionic acid).

The number of acetoacetoxy groups introduced into the polyol may be varied. The polyol may be fully acetoacetylated, where substantially all of the hydroxyl groups have been replaced with acetoacetoxy groups, or it may be partially acetoacetylated, where only a fraction of the available hydroxyl groups have been replaced with acetoacetoxy groups. It is understood in the art that some residual hydroxyl groups may remain even when full acetoacetylation is desired. In some applications, as discussed below, residual hydroxyl groups may provide benefits to the resin. When substantially all the hydroxyl groups are converted to acetoacetoxy groups corresponds to a 1:1 ratio of hydroxyl groups to acetoacetoxy groups and where a portion of the acetoacetoxy groups is converted the ratio is less than 1:1.

One embodiment of the invention is an acetoxylated polyol ester where only a portion of the hydroxyl groups of the polyol are replaced by acetoacetoxy groups, at least a portion or all of the remaining hydroxyl groups are esterified with a saturated monofunctional carboxylic acid ester, unsaturated monofunctional carboxylic acid ester, or a mixture thereof. The carboxylic acid may be a $C_1$-$C_{20}$ carboxylic acid, with straight-chain or not heavily branched carboxylic acids being preferred. The carboxylic acid may be saturated or unsaturated. Preferably the carboxylic acid used to esterify the polyol is a fatty acid such as, but not limited to, lauric acid, myristic acid, palmitic acid, stearic acid, oleic acid, ricinoleic acid, linoleic acid, linolenic acid, eleasteric acid, and mixtures of fatty acids as well. When fatty acids or mixtures of fatty acids are used the resin is an acetoxylated polyol ester of a fatty acid. Mixtures of fatty acids occur in vegetable or seed oils, plant oils, which may be used in the invention. The plant oils contain mixtures of fatty acids with ethylenically unsaturated and saturated fatty acids possibly present depending on the type of oil. Examples of oils which may be used in the invention, include but are not limited to, coconut oil, corn oil, castor oil, soybean oil, safflower oil, sunflower oil, linseed oil, tall oil fatty acid, tung oil, vernonia oil, and mixtures thereof. The polyol fatty acid ester may be prepared by direct esterification of the polyol or by transesterification as is known in the art.

Enamine Resins

Enamine resins of the invention may be prepared by reacting an acetoacetylated resin, such as described above, with a $C_1$-$C_{20}$ alkyl amine or a mixture of $C_1$-$C_{20}$ alkyl amines. The conversion of acetoacetoxy groups to enamines is described in U.S. Pat. Nos. 6,794,049; 6,780,523; and 5,464,849; which are incorporated herein by reference. Exemplary $C_1$-$C_{20}$ alkyl amines which may used to prepare enamine resins of the invention include, but are not limited to, butylamine, hexylamine, octylamine, decylamine, dodecylamine, octadecylamine, or mixtures thereof. An enamine resin of the invention may then be a reaction product of an acetoacetylated resin, where substantially all hydroxyl groups of the polyol are replaced by acetoacetate groups, and a $C_1$-$C_{20}$ alkyl amine or a mixture of $C_1$-$C_{20}$ alkyl amines. An enamine resin of the invention may also be a reaction product of an acetoacetylated resin, where a portion of hydroxyl groups of the polyol are replaced by acetoacetate groups, and a $C_1$-$C_{20}$ alkyl amine or a mixture of $C_1$-$C_{20}$ alkyl amines. Another enamine resin of the invention be a reaction product of an acetoacetylated resin, where a portion of hydroxyl groups of the polyol are replaced by acetoacetate groups and some or all of the remaining hydroxyl groups are replaced by a saturated monofunctional carboxylic acid ester, unsaturated monofunctional carboxylic acid ester, or a mixture thereof, and a $C_1$-$C_{20}$ alkyl amine or a mixture of $C_1$-$C_{20}$ alkyl amines.

The degree of enamine functionality may also be varied such that substantially all or only a portion of the acetoacetoxy groups in the resin may be converted to enamines. As with the hydroxyl groups, converting substantially all the acetoacetoxy groups corresponds to a 1:1 ratio of enamines to acetoacetoxy groups and where a portion of the acetoacetoxy groups is converted the ratio is less than 1:1.

Coating Compositions

The invention relates to curable coating compositions which may be formulated with or without solvents. A curable coating composition of the invention contains a resin such as those discussed above, at least one metallic drier compound; and optionally one or more solvents. A coating composition may be a solvent-free coating composition or may optionally contain a solvent such as, for example, acetone, THF, methyl ethyl ketone (MEK), xylene, etc. The coating composition may be a solution in such a solvent or mixture of solvents.

Coating compositions of the invention may contain a mixture of the resins as well as other film-forming components. In one embodiment, for example, a coating composition may contain an acetoxylated polyol ester of a fatty acid; a partially enamine-substituted, acetoxylated polyol; a poly-functional amine compound having two or more primary amine groups; at least one metallic drier; and optionally one or more solvents. The polyfunctional amine is a curing agent which acts as an enamine crosslinker upon film formation. Suitable curing agents for use with the compositions of the inventions include aliphatic, araliphatic, cycloaliphatic and aromatic amines, polyamides, amidoamines and epoxy-amine adducts.

Suitable amine curing agents are those which are soluble or at least dispersible in a coating composition of the invention. Amine curing agents known in the art include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N"-bis(3-aminopropyl)butane-1,4-diamine; 1-ethyl-1,3-propanediamine; 2,2 (4),4-trimethyl-1,6-hexanediamine; N,N-bis(3-aminopropyl)ethylenediamine; 2,4(6)-toluenediamine; tetraethylenepentamine;

3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl)cyclohexane; and 1-cyclohexyl-3,4-dimino-cyclohexane. As exemplary araliphatic amines, in particular those amines in which the amino groups are present on the aliphatic radical, include, for example, m- and p-xylylenediamine and its hydrogenation products as well as diamide diphenylmethane; diamide diphenylsulfonic acid (amine adduct); 4,4"-methylenedianiline; 2,4-bis(p-aminobenzyl)aniline; diethyltoluenediamine; and m-phenylene diamine. The amine curing agents may be used alone or as mixtures.

Suitable amine-epoxide adducts include, for example, reaction products of diamines, such as ethylenediamine, diethylenetriamine, triethylenetetramine, m-xylylenediamine and/or bis(aminomethyl)cyclohexane with terminal epoxides, such as the polyglycidyl ethers of the polyhydric phenols listed above.

Polyamide resins can also serve as curing agents for the resins. Suitable polyamide reins include those prepared through the reaction product of multifunctional amines with diacids. Dimer fatty acids are the most commonly used diacids for the synthesis of polyamide resins.

A preferred, amine curing agent used with the coating compositions of the invention is PACM (bis(para-aminocyclohexyl)methane).

Coatings formed from the coating compositions of the invention may be oxidatively crossinked. This oxidative crosslinking process is commonly accelerated by adding driers such as, for example, various salts of cobalt, lead, manganese, iron, zinc, calcium, cerium, vanadium, barium, zirconium, aluminum, and combinations thereof. Preferably, the drier includes a cobalt drier. Mixtures of driers, i.e. a drier system, may also be used. The driers typically are used as octoates or naphthenates, in an amount of from 0.005-0.5 wt. % metal, based on the resin. Examples of commercial products are Zirconium HEX-CEM, Cobalt TEN-CEM, Calcium CEM-ALL, Zirconium HYDRO-CEM, and Cobalt HYDRO-CURE II, all sold by OMG Americas of Westlake, Ohio. A description of metal driers, their functions, and methods for using them may be found in Handbook of Coatings Additives, p. 496-506, ed. by L. J. Calbo, Marcel Dekker, INC. New York, N.Y., 1987, incorporated by reference herein in its entirety.

Although the invention encompasses the use of conventional amounts of metal driers, the improved crosslinking exhibited according to the claimed invention suggests that lower amounts of driers may be used than are required in conventional coatings. Further, the improved tack-free time of the inventive compositions suggests that lower amounts of surface driers may be required than are typically used in conventional coatings. The claimed invention thus is intended to encompass formulations having little or substantially no metal drier added.

The invention also relates to the use of a coating composition which may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The coating composition of the invention may be cured at room temperature (ambient cure) or at elevated temperatures (thermal cure), or may be cured photochemically.

A coating composition of the invention may further contain coating additives. Examples of such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

EXAMPLES

Raw Materials: Sucrose (assay≥99.5%, HPLC), β-D-Fructofuranosyl-α-D-glucopyranoside, was purchased from Sigma-Aldrich. Tertiary-butyl acetoacetate (t-BAA, >98%) was provided by Eastman Chemical Company. Butylamine, hexylamine, octylamine, decylamine, dodecylamine and octadecylamine were purchased from Sigma-Aldrich, and were used as primary mono amines. Fully esterified sucrose soyate (SEFOSE 1618U) and partially sucrose soyate (SEFOSE1618U B6) were provided by Procter & Gamble Company. COBALT HEX-CEM (12%) and ZIRCONIUM HEX-CEM (18%) were provided by OMG (OH). Nuxtra Zinc (8%) was provided by DURA Chemicals, Inc. (CA). These metal salts were used as dryers in autoxidation. AMICURE PACM curing agent (AHEW=52.5 g/mole), 4,4'-methylenebiscyclohexanamine, were provided by Air Products Company. All materials were used as received without further purification.

Analytical Methods

Gel Permeation Chromatography: Molecular weight was determined using a Waters 2410 gel permeation chromatograph equipped with refractive index detector. A 1.5% sample solution in THF using a flow rate of 1 ml/min was used.

FTIR Spectroscopy: FTIR measurements were done by a Nicolet Magna-850 FTIR spectrometer. Samples were prepared in THF solutions, and the concentration was exactly controlled as 4 mg/ml. For each sample solution, a 200ł drop was deposited by micropipette and naturally spread out on the center of potassium bromide salt crystal. After the evaporation of THF, a thin layer of polymer was left. Spectra acquisitions were based on 32 scans with data spacing of 1.98 $cm^{-1}$, and the data were set for auto gain to monitor spectral ranges of 4000-500 $cm^1$.

$^1$H-NMR Spectroscopy: $^1$H-NMR measurements were done at 23° C. using a JOEL-ECA (400 MHz) NMR spectrometer with an auto sampler accessory. All measurements were made using $CDCl_3$ as solvent. The data was processed using the Delta software package.

Differential Scanning Calorimetry: A DSC Q1000 from TA Instruments with an auto sampler was used for glass transition temperature ($T_g$) and melting point ($T_m$) determinations. Polymers were subjected to a heat-cool-heat cycle from −90 to +100° C. by ramping at 10° C./min for both heating and cooling cycles. The second heating cycle was used to characterize the samples.

Coating measurements: The thickness of the cured coating was measured prior to any test below. König pendulum hardness and gouged pencil hardness was done according to ASTM D 4366-95 and ASTM D 3363-00, respectively. The adhesion of cured coatings was evaluated using ASTM D 3359-97. Methyl ethyl ketone (MEK) double rub test was done using ASTM D 5402-93. Impact resistance test was studied according to ASTM D 2794-93, and the results were presented by the weight of metal cylinder (4 lb) multiplying the maximum height (inch). Mandrel bend test was carried out based on ASTM D 522-93a, and the results were presented as the elongation range of the coating at cracking.

Drying time: The drying times of coatings were characterized using the BK3 3-Speed Drying Record (MICKLE Laboratory Engineering Co. Ltd., United Kingdom). It was designed as a needle carrier holding six hemispherical ended needles traveled the length of the six 305*25 mm glass test strips in 6, 12 or 24 hours. In this study, the paint films were casted by stainless steel Cubic Film Applicator with the gap of 76 MU (film width13 mm, thickness 75 μm). Each hemispherical ended steel needle was equipped with a brass weight (5 grams) to study the through-drying properties of these co-curable coatings. The needle travel time was selected as 24 hours. The drying times were evaluated as Open time (I), Dust free time (II) and Tack free time (III) (Klaasen, et al., *Progress in Organic Coatings*, 2006, 55, 149-153).

Example 1

Synthesis of Fully Acetoacetylated Sucrose (AS) and Enamine Acetoacetylated Sucrose (EAS)

The synthesis of fully acetoacetylated sucrose (AS) and enamine acetoacetylated sucrose (EAS) as described in this example is shown in Scheme 1.

-continued

Enamine of acetoacetylated sucrose n = 3, 4, 5, 8
Carbon number of R = 4, 6, 8, 10, 12, 18

1.1 Synthesis of AS: In a 500 mL four-neck flask equipped with a mechanical stirrer, nitrogen inlet, thermocouple, reflux condenser and Dean-Stark trap, 50.0 g (0.146 moles) of sucrose and 184.9 g of tert-butylacetoacetate (t-BAA) (1.169 moles) were added. The reactants were stirred and heated up to 130° C. During the reaction, the nitrogen inner pressure was kept in positive, and 84.8 g of t-butanol (1.145 moles) was collected in Dean-Stark trap as byproduct. The reaction was stopped when no more t-butanol came out. Finally, a yellow viscous product was obtained as AS. In FTIR spectra, AS was confirmed by the complete disappearance of the broad hydroxyl stretching band at 3000-3600 cm$^{-1}$ and the appearance of two carbonyl stretching bands at 1735 cm$^{-1}$ and 1780 cm$^{-1}$. In $^1$H-NMR spectrum of AS, the peaks of protons on sucrose is observed at 4.1-5.7 ppm, and the peaks of methyl protons and methylene protons on acetoacetates are observed at 2.1-2.3 ppm and 3.4-3.7 ppm, respectively.

1.2 Synthesis of EAS: Fully enamined acetoacetoxy sucrose (EAS) was synthesized as the second step reaction after AS synthesis. The reaction temperature was 110° C., and water was collected in Dean-Stark trap as the byproduct of enamine formation reaction. The reaction was stopped when no more water came out. Finally, a red-yellow viscous product was obtained as EAS. To synthesize fully substituted EAS, primary monoamine and AS were charged in the molar ratio of 8/1. To synthesize dodecylamine enamined acetoacetylated sucrose (D-EAS) with different DES, dodecylamine and AS were charged in the molar ratio of 5/1, 4/1 and 3/1. To synthesize octadecylamine/dodecyamine enamined acetoacetylated sucrose (O/D-EAS) with degree of enamine substitution (DES) as three, octadecylamine, dodecylamine and AS were charged in the molar ratio of 1/2/1.

As described, primary monoamines (butylamine, hexylamine, octylamine, decylamine, dodecylamine and octadecylamine) were used to synthesize fully substituted EAS (f-EAS), respectively. Their different length of enamine "arms" results in different hydrodynamic volumes in THF, and different retention times in GPC. In $^1$H-NMR spectrum of -D-EAS, the peak of methyl protons and the peak of methylene protons on D-EAS are observed at 0.8 ppm and 3.2 ppm, respectively. The peak of secondary amine (—NH—) proton observed is observed at 8.4-8.5 ppm.

Figure 1:
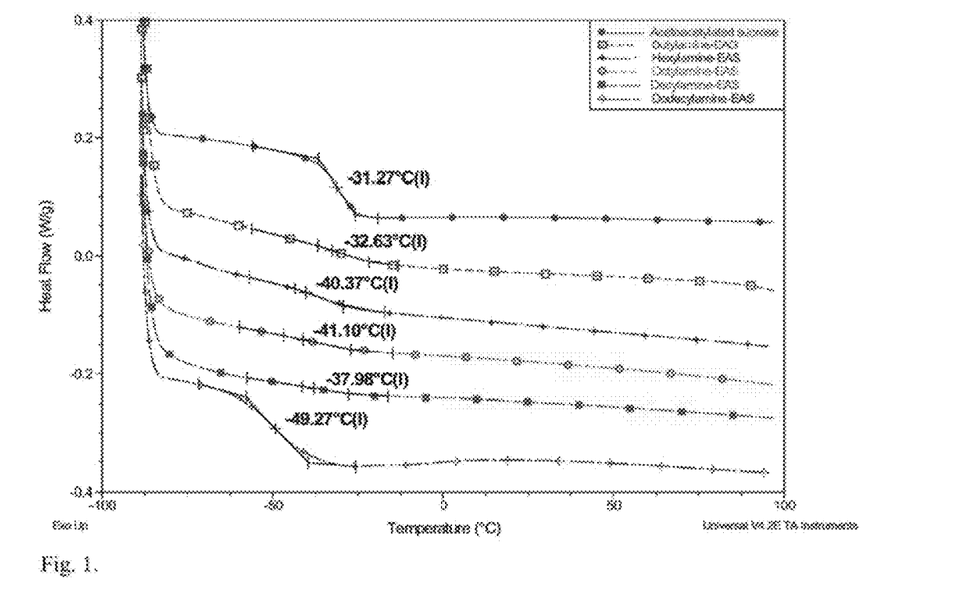
FIG. 1 depicts DSC curves indicating glass transition of fully enamine substituted acetoacetylated sucrose (f-EAS) prepared using different lengths of primary monoamine.
Figure 2:
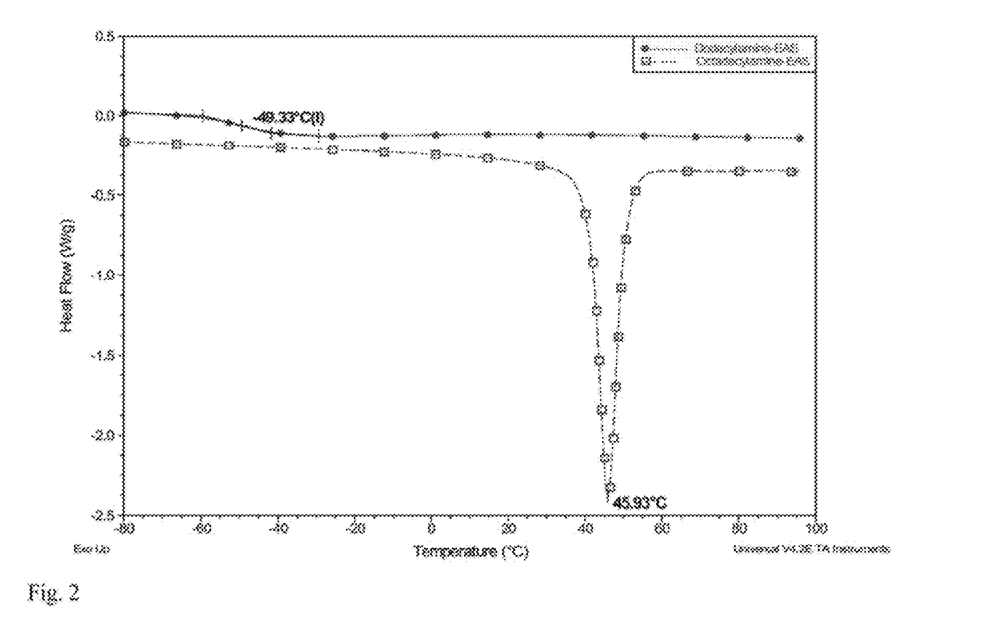
FIG. 2 depicts DSC curves of dodecylamine-EAS (D-EAS) and octadecylamine-EAS (O-EAS).

As shown in the DSC thermogram of FIG. 1, glass transition temperature of AS ($T_g$=−31.27° C.) is decreased with the extension of "enamine arms" from butylamine-EAS ($T_g$=−32.63° C.) to dodecylamine-EAS ($T_g$=−49.27° C.). The longer "enamine arms" provide the larger volume between EAS molecules, which gives more degrees of freedom available to molecule segmental mobility. But, as Odian said "the extent to which a polymer crystallized depends on whether its structure is conducive to packing into crystalline state . . . " [(Odian, *Principles of Polymerization* 4$^{th}$ Ed., 2004, 1, 24-29), some "enamine arm" will be extended long enough to reach the point of tending pack because of its structural regularity, lattice arrangement and compactness. Octadecylamine-EAS (O-EAS) is a brittle crystalline material at room temperature, and it shows a large melting peak ($T_m$=49.56° C.) and the absence of a $T_g$ transition state (FIG. 2). From butylamine-EAS to dodecylamine-EAS, they are completely amorphous polymers because they only show one $T_g$, and O-EAS is a completely crystalline polymer because it only shows a $T_m$. Thus, some EAS synthesized using the primary monoamine in the length between dodecylamine and octadecylamine probably will be a semicrystalline polymer, which is able to show both $T_g$ and $T_m$.

1.3 Preparation of Partially Enamined Acetoacetoxy Sucrose

Partially enamine substituted D-EAS (p-D-EAS) was prepared with dodecylamine and AS via EF reaction. The degree of enamine substitution (DES) value of D-EAS was successfully controlled by the molar feed ratio of dodecylamine to AS. The different DES results in different hydrodynamic volumes of p-D-EAS in THF solution, and different retention times in the GPC.

Figure 3:
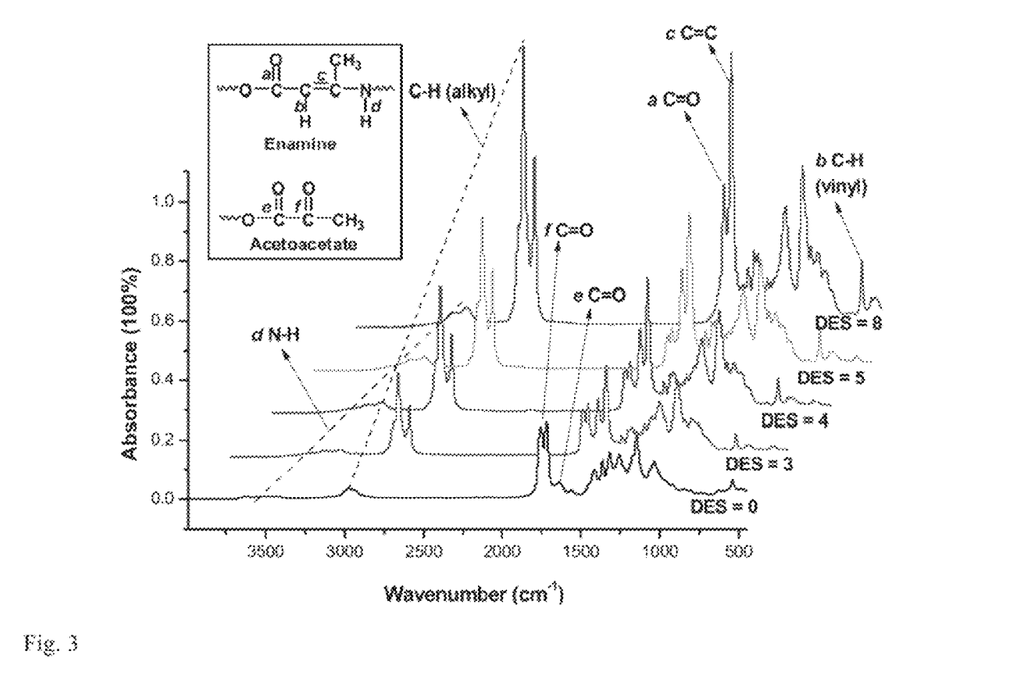
FIG. 3 depicts FT-IR spectra of acetoacetylated sucrose (AS) and dodecylamine enamine substituted acetoacetylated sucrose (D-EAS) with different degree of enamine substitution (DES).

Since FTIR samples were carefully prepared using the film thickness technique discussed above to obtain the same film thickness, FTIR absorption spectra of D-EAS samples were suitable to qualitative and quantitative analysis. As shown in FIG. 3, higher enamine substitution results in higher intensity of secondary amine N—H stretching at 3500 cm$^{-1}$ and C—H stretching at 2900-3100 cm$^{-1}$. As the DES value increases, the intensity of enamine carbonyl C=O peak at 1610-1690 cm$^{-1}$ and enamine vinyl C—H peak at 770 cm$^{-1}$ is gradually enhanced, but the intensity of acetoacetate C=O stretching at 1730-1780 cm$^{-1}$ is reduced.

Figure 4:
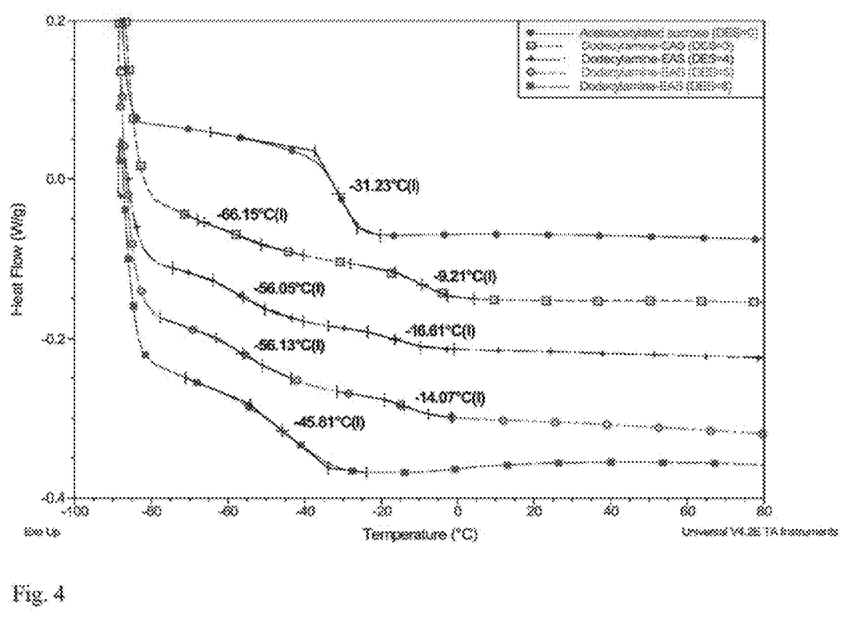
FIG. 4 depicts DSC curves indicating glass transition of acetoacetylated sucrose (AS) and dodecylamine enamine substituted acetoacetylated sucrose (D-EAS) with different degrees of enamine substitution (DES).

In FIG. 4, DSC thermograms of p-D-EAS all show glass transition states without any melting; they are amorphous. But each p-D-EAS presents two glass transition states, which means they have two $T_g$. Based on the previous discussion, the higher $T_g$ is contributed by acetoacetate, and the lower $T_g$ is contributed by dodecylamine enamine.

Example 2

Synthesis of Acetylated Sucrose Soyate (ASS)

2.1 Scheme 2 shows the synthesis of ASS as described in this example.

Scheme 2.

Partially esterified sucrose soyate
Func. of fatty acid = 6
Func. of hydroxyl = 2 t-butyl acetoacetate

Acetoacetylated sucrose soyate
Func. of fatty acid = 6
Func. of acetoacetate = 2
R = soybean fatty acids In a 500 mL four-neck flask equipped with a mechanical stirrer, nitrogen inlet, thermocouple, reflux condenser and Dean-Stark trap, 100g (0.054 moles) of p-SS (SEFOSE 1618U B6) and 17.2 g of t-BAA (0.108 moles) were added. After 30 minutes nitrogen pre-purge, the reactants were heated up to 130° C. During the reaction, the nitrogen inner pressure was kept positive, and 9.1 g of t-butanol (0.108 moles) was collected in Dean-Stark trap as byproduct. The reaction was stopped when no more t-butanol came out. Finally, a light yellow liquid was obtained as ASS product.

Partially esterified sucrose soyate (p-SS) had six soybean fatty acid groups and two hydroxyl groups. It was modified by t-BAA in acetoacetylation reaction to obtain acetoacetylated sucrose soyate (ASS), which meant the hydroxyl groups were substituted by the acetoacetates. The GPC plots of p-SS and ASS, showed that the molecular weight of ASS was slightly higher than that of p-SS. The structure of ASS was confirmed by FTIR and $^1$H NMR spectroscopy. The FTIR spectrum of p-SS showed a medium hydroxyl stretching band at 3300-3500 cm$^{-1}$, which disappears in the FTIR spectrum of ASS. The FTIR spectrum of ASS shows a small acetoacetate carbonyl absorption peak at 1680 cm'. The $^1$H-NMR spectrum of ASS showed the methyl proton (on acetoacetate) peak at 2.23 ppm and methylene proton (on acetoacetate) peak at 3.34 ppm, and they are not observed in the spectrum of p-SS.

Example 3

Compatibility Studies 3.1 Enamine Length: Fully esterified sucrose soyate (f-SS) and enamined acetoacetylated sucrose (EAS) are both hyperbranched polymers with compact structures. The effect of enamine alkyl chain length on compatibility was studied using fully enamine alkyl substituted acetoacetylated sucrose (f-EAS) and sucrose soyate (SS). Different alkyl amine resulted in different length of enamine alkyl chain on f-EAS. The f-EAS/SS bicomponent mixtures were mixed in a weight ratio of 1:1. The two components were mixed in xylene solution (80 wt % solid content). The mixtures were allowed to stand for three days before assessing compatibility. Compatibility was visually assessed by the absence of two layers.

In solution or in the melt, the compatibility between hyperbranched polymers is highly related to the size of 3D hydrodynamic volume of polymer spheres, which is determined by the length of branch and density of branches. Thus, the hydrodynamic volume of EAS may be adjusted by the enamine length and DES for the compatibility between f-SS and EAS.

Table 2. D-EAS becomes miscible with SS when its degree of substitution is four. Interestingly, O/D-EAS-3 (octadecylamine: dodecylamine=1:2) is miscible with SS and ASS when its degree of substitution is three. The miscible bicomponent made of O/D-EAS-3 and ASS consists of seven acetoacetates and six soyate fatty acid groups for dual-curing, and three enamine alkyls to provide compatibility.

TABLE 2

The effect of degree of enamine substitution on the compatibility between SS and f-EAS.

| Entry (mixture) | Compatibility rating | Functionality | | | Functionality | | |
|---|---|---|---|---|---|---|---|
| | | Compound 1 | FA | AA | Compound 2 | EA | AA |
| 1 | N | SS | 8 | 0 | AS | 0 | 8 |
| 2 | N | SS | 8 | 0 | D-EAS-3 | 3 | 5 |
| 3 | Y | SS | 8 | 0 | D-EAS-4 | 4 | 4 |
| 4 | Y | SS | 8 | 0 | D-EAS-5 | 5 | 3 |
| 5 | Y | SS | 8 | 0 | D-EAS-8 | 8 | 0 |
| 6 | Y | SS | 8 | 0 | O/D-EAS-3 | 3 | 5 |
| 7 | Y | ASS | 6 | 2 | O/D-EAS-3 | 3 | 5 |

FA: fatty acid;
AA: acetoacetate;
EA: enamine;
Y = compatible;
N = incompatible

The effect of enamine alkyl length on the compatibility of f-EAS with sucrose soyate is shown in Table 2. Decylamine-EAS is the boundary, which is miscible with SS in THF, MEK and xylene solutions, but not in acetone or solvent-free. Dodecylamine-EAS is the only f-EAS compatible with SS in all the listed conditions at room temperature. Octadecylamine-EAS is compatible with SS in the melt state (m. p.=46° C.), but phase separation occurs upon cooling because of its crystalline nature at ambient conditions.

TABLE 1

Compatibilities between fully enamined acetoacetylated sucrose (EAS) and fully esterified sucrose soyate (f-SS) in solvent-free and solutions

| EAS names | Compatibility results | | | | |
|---|---|---|---|---|---|
| | Solvent-free | Acetone | THF | MEK | xylene |
| Butylamine-EAS | N | N | N | N | N |
| Hexylamine-EAS | N | N | N | N | N |
| Octylamine-EAS | N | N | N | N | N |
| Decylamine-EAS | N | N | Y | Y | Y |
| Dodecylamine-EAS | Y | Y | Y | Y | Y |
| Octadecylamine-EAS (melted) | Y | Y | Y | Y | Y |

Y represents the compatible
N represents the incompatible 3.2 Degree of Enamine Substitution: The effect of the degree of enamine alkyl substitution on the compatibility was studied using partially enamine alkyl substituted acetoacetylated sucrose (p-EAS) and SS. The p-EAS/SS bicomponent mixtures were formulated in the weight ratio of 1:1 in the absence of solvent. The mixtures were allowed to stand for three days before assessing compatibility. Compatibility was visually assessed as the absence of two layers.

Figure 5:
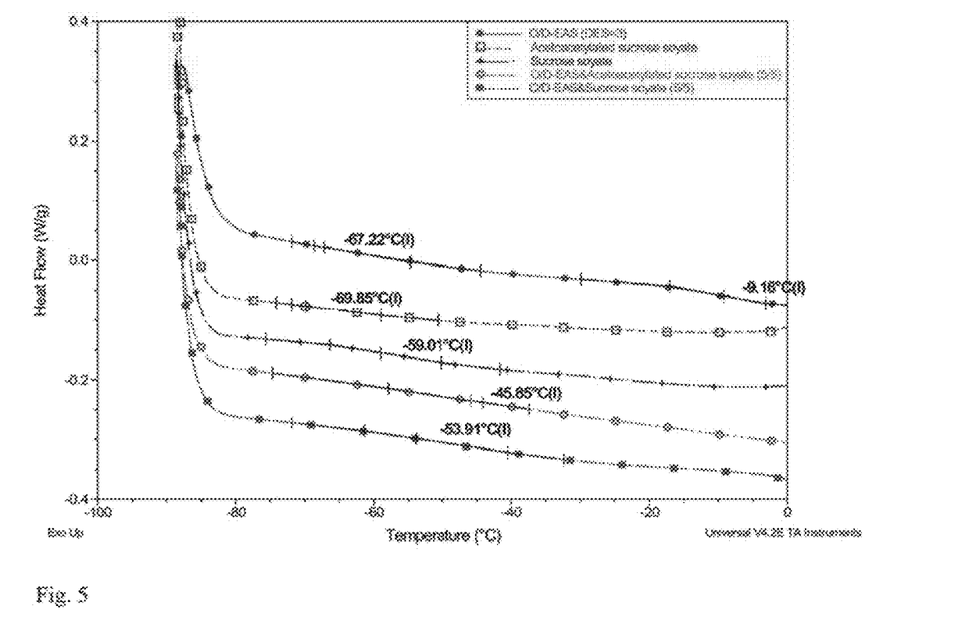
FIG. 5 depicts DSC curves of fully esterified sucrose soyate (f-SS), acetoacetylated sucrose soyate (ASS), and their blends (5/5, in weight ratio) with O/D-EAS (DES=3).

The effect of the degree of enamine substitution on the compatibility of p-EAS with sucrose soyate is shown in Polymers are miscible if they form a single phase. The observation of a single glass transition with one $T_g$ in a system of polymer blends is an indication of miscible system. Conversely, an immiscible blend will present two glass transitions corresponding to the individual components. According to the DSC thermograms in FIG. 5, each of the blends of f-SS/EAS=5/5 and ASS/EAS=5/5 shows a single glass transition with one $T_g$ value. Thus, the single glass transition in DSC for each blend strongly proves their miscibility.

Example 4

Coating Formulations 4.1 SS Based Coatings: The sucrose fatty ester based coatings were formulated solvent-free. Cobalt, zinc and zirconium driers were added to the resin at 0.04 wt %, 0.03 wt % and 0.1 wt % (based on resin solids), respectively. Sonication was used for one hour to disperse the driers. The EAS based coatings were formulated in xylene solution (80 wt % of solid content). PACM diamine crosslinker was used in the ratio of amine to acetoacetate equivalents as 1:1. The bicomponent dual-cure coatings were formulated in xylene solution (80 wt % of solid content). The driers were added with the same weight percent as above based on ASS, and then PACM diamine crosslinker was used in the ratio of amine to acetoacetate equivalents as 1:1. All coatings were cast on solvent-cleaned QD-36 steel panels using a drawdown bar with a gap of 4 mils. The coatings were kept at ambient for two days for network formation. Tack free samples were further cured in an oven at 80° C. for two hours, and then kept at ambient conditions for 3 more days before testing.

Fully esterified sucrose soyate (f-SS), partially esterified sucrose soyate (p-SS) and acetoacetylated sucrose soyate (ASS) are sucrose soyate based materials. Because of their richness of soybean fatty acids, they are capable of contributing air-drying (AD) crosslinking to the co-curable system. Before blending, their air-drying (AD) coating properties were studied, respectively. In each formulation, cobalt, zinc and zirconium salts were used as dryers in 0.04 wt %, 0.03 wt % and 0.1 wt % (based on the weight of SS or ASS). Additionally, ASS was cured by AD and EF in the presence of PACM diamine crosslinker (acetoacetate:amine=1:1) and the same content of dryers.

The coating properties are shown in Table 3. It seems that air-drying (AD) cured SS based coatings are soft, flexible, and have low solvent resistance. Interestingly, EF&AD co-cured ASS coating is harder, and have much higher solvent resistance than f/p-SS.

4.3 Co-curable blends The autoxidation cured coatings tend to be soft, but flexible, while the amine cured coatings are hard and brittle, so combining the two systems could lead to coatings having an optimum set of properties. The bicomponent system comprised of ASS and O/D-EAS-3 was chosen for the exploration of the dual curing system. This blend was capable of maintaining one-phase state throughout the two different curing processes. PACM was used as the diamine crosslinker. As before, a mixture of cobalt, zinc and zirconium salts were used as the metal salt driers.

Since the speed of EF curing using PACM is much faster than autoxidation curing, the dual-cure process is separated into two steps (FIG. 6): Step I is EF curing, and Step II is autoxidation curing. In Step I, ASS and PACM serve as difunctional reactants, and O/D-EAS-3 serves as a pentafunctional reactant and thus a high degree of crosslinking can be achieved. In the autoxidation curing phase (Step II),

TABLE 3

Properties of SS based coatings

| Sample names | Thickness (μm) | König pendulum hardness (s) | Pencil hardness (gouge) | Cross-hatch adhesion | MEK double rub resistance | Reverse impact (in-lb) | Mandrel bend (elongation-at-break) |
|---|---|---|---|---|---|---|---|
| f-SS | 58 ± 9 | 14 | <EE | 4B | 32 | >172 | >28% |
| p-SS | 61 ± 7 | 13 | <EE | 4B | 16 | >172 | >28% |
| ASS | 56 ± 6 | 17 | EE | 4B | 28 | >172 | >28% |
| ASS* | 65 ± 6 | 37 | 6B | 2B | 132 | 120 | >28% |

*ASS was cured by PACM enamine formation and fatty acid air-drying 4.2 EAS Based Materials Acetoacetylated sucrose (AS), dodecylamine enamine substituted acetoacetylated sucrose (D-EAS) with the degree of enamine substitution 4 and 5, and octadecylamine/dodecylamine enamine substituted acetoacetylated sucrose (O/D-EAS) with the degree of enamine substitution 3 are all acetoacetate functional materials and thus capable of undergoing enamine formation curing using PACM as a difunctional crosslinker.

Figure 6:
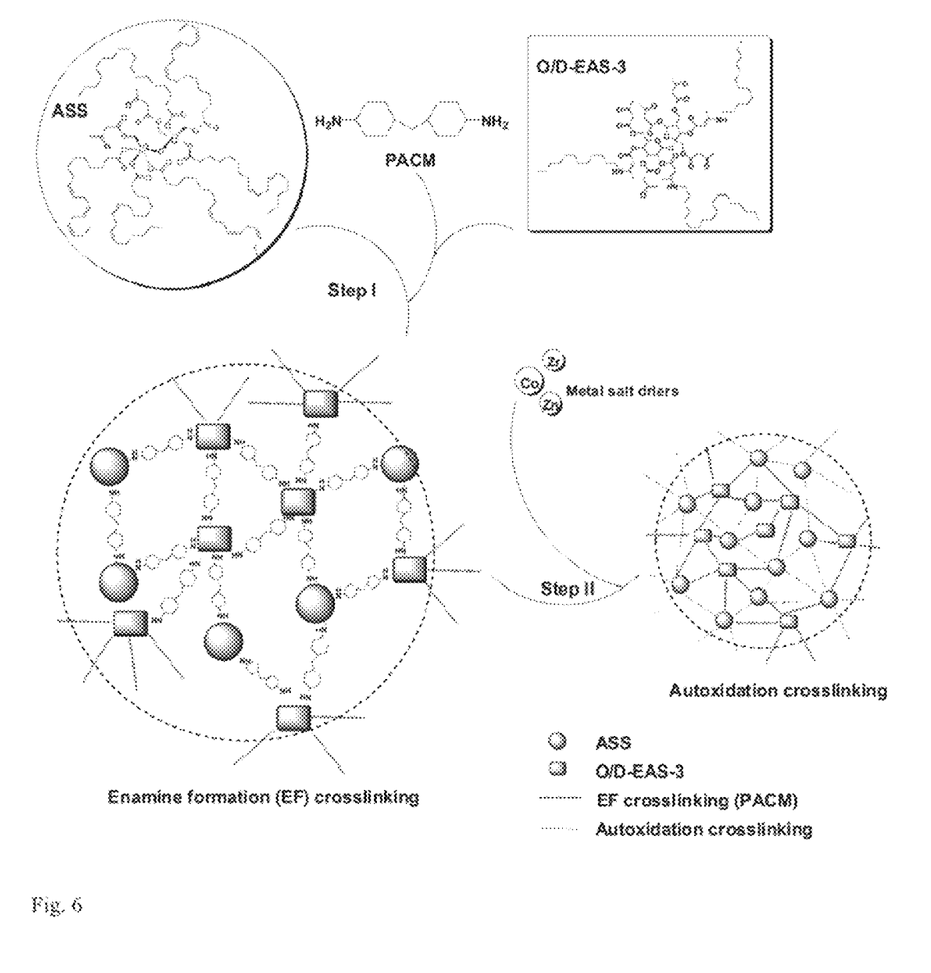
FIG. 6 depicts a co-curing process of blend of ASS and O/D-EAS-3.

The coating properties are shown in Table 4. It is observed that PACM-cured EAS based coatings are all hard and brittle. Their solvent resistances are reduced with the increase of enamine substitution, due to the decrease of crosslink density.

only ASS contains the unsaturated fatty acids, which can be crosslinked via autoxidation and accelerated by metal salt driers.

The properties of a series of dual-cured coating made from different ratios of ASS and O/D-EAS-3 are shown in Table 5. Compared with the properties of autoxidation cured SS based coatings (Table 3) and EF cured EAS based coatings (Table 4), the dual-cured coatings show properties balanced between the flexibility of SS and rigidity of EAS. The composition of the two components (weight ratio) has an influence on the coating properties. As the content of ASS increases, the coating is softer and more flexible; conversely, more O/D-EAS-3 results in harder and less flexible films.

TABLE 4

Properties of EAS based coatings

| Sample names | Thickness (μm) | König pendulum hardness (s) | Pencil hardness (gouge) | Cross-hatch adhesion | MEK double rub resistance | Reverse impact (in-lb) | Mandrel bend (elongation-at-break) |
|---|---|---|---|---|---|---|---|
| AS | 56 ± 3 | 188 | 3H | 1B | >400 | <4 | <3.3% |
| D-EAS-5* | 48 ± 5 | 100 | 5B | 3B | 9 | 10 | >28% |
| D-EAS-4 | 51 ± 5 | 138 | 4B | 3B | 55 | 8 | >28% |
| D-EAS-3 | 50 ± 6 | 163 | HB | 2B | 106 | 4 | >14% |
| O/D-EAS-3 | 47 ± 6 | 167 | HB | 2B | 109 | 4 | >14% |

*D-EAS-5 represents D-EAS with the degree of enamine substitution (DES) = 5

TABLE 5

Properties of co-curable coatings (ASS and O/D-EAS-3)

| Weight ratio of ASS to O/D-EAS-3 | Thickness (μm) | König pendulum hardness (s) | Pencil hardness (gouge) | Cross-hatch adhesion | MEK double rub resistance | Reverse impact (in-lb) | Mandrel bend (elongation-at-break) |
|---|---|---|---|---|---|---|---|
| 3/7 | 50 ± 4 | 136 | B | 2B | 121 | 12 | >14% |
| 5/5 | 52 ± 6 | 53 | 2B | 4B | 68 | 20 | >28% |
| 7/3 | 58 ± 8 | 35 | 5B | 4B | 41 | 40 | >28% |

4.4 Drying time studies Since EF curing is much faster than AD curing, the drying times were studied separately in three groups: SS based coatings, EAS based coatings, and co-curable coatings (O/D-EAS-3 and ASS). The results are shown as the bar graphs in FIG. 7, in which the open time, dust free time, and tack-free time are designated for each coating formulation.

Figure 7A:
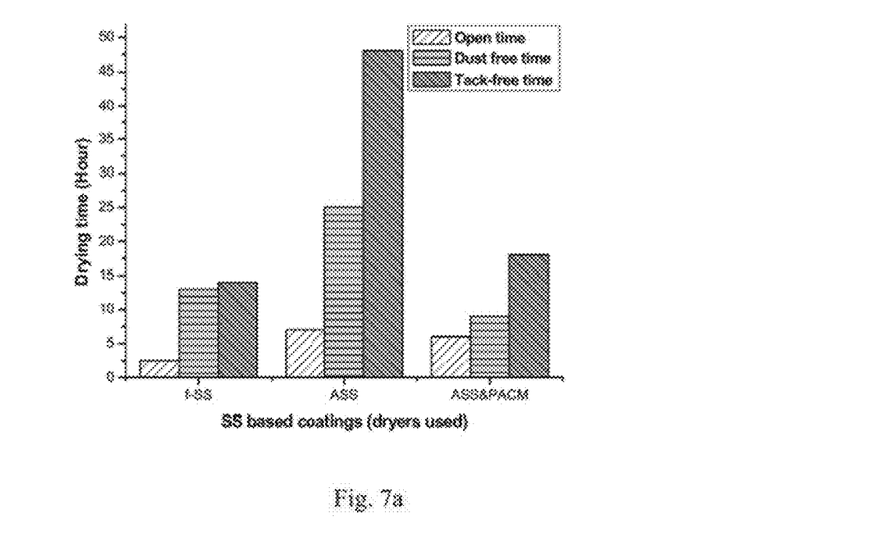
FIG. 7 depicts bar graphs of drying time from Example 4.3.

In FIG. 7a, ASS dries slower than f-SS does via AD curing in the presence of same amount dryers. Acetoacetates have been reported as contributing to the air-drying process with unsaturated fatty acids for conventional alkyd coatings. U.S. Pat. Nos. 6,794,049; 6,780,523; and 5,484,849. But, the observation in this study demonstrates that acetoacetates probably contribute to AD curing with fatty acids, but they cannot be more efficient or provide more crosslinking than fatty acids. Thus, acetoacetylation of sucrose soyate is not meaningful as the acetoacetylation of conventional alkyd, in the purpose of accelerating the air-drying process.

Figure 7B:
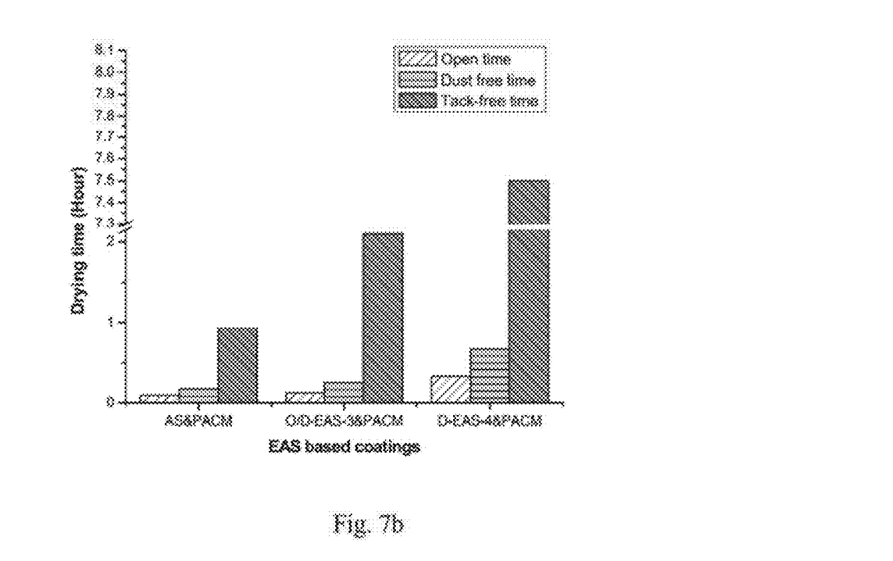

In FIG. 7b, EF cured DES coatings accomplish the state of dust free within one hour. It proves that EF curing with PACM is much faster than AD curing of fatty acids with dryers.

Figure 7C:
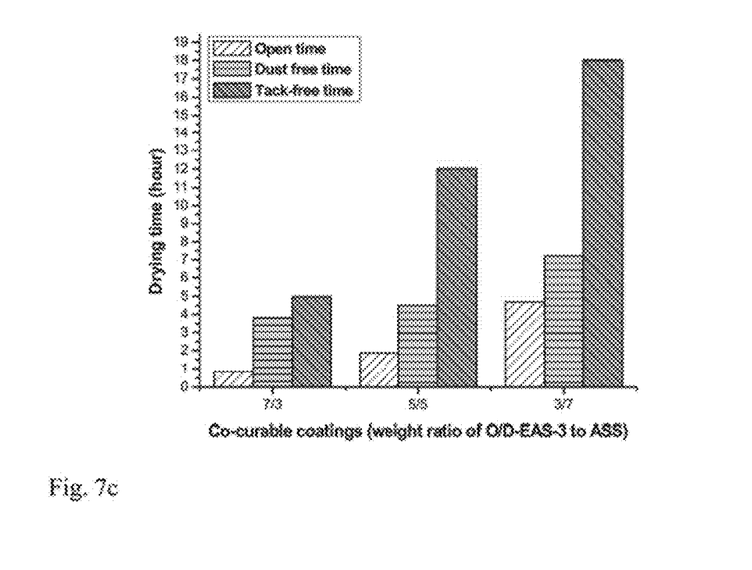

In FIG. 7c, co-curable coatings accomplish drying faster than AD cured SS, but slower than EF cured EAS. As the content of ASS increases, the drying times shift to the longer; conversely, more O/D-EAS-3 results in shorter drying time.

The claimed invention is:

1. An acetoacetylated resin which is the reaction product of:
   a) a polyol having 4 or more hydroxyl groups and
   b) at least one acetoacetate;
   wherein a portion of the hydroxyl groups of the polyol are replaced by acetoacetate groups; and
   wherein the remaining hydroxyl groups are replaced by a saturated monofunctional carboxylic acid ester, an unsaturated monofunctional carboxylic acid ester, or a mixture thereof selected from a vegetable or seed oil carboxylic acid ester,
   wherein the polyol having 4 or more hydroxyl groups is sucrose.

2. An enamine resin which is the reaction product of:
   a) an acetoacetylated resin of claim 1, and
   b) a $C_1$-$C_{20}$ alkyl amine or a mixture of $C_1$-$C_{20}$ alkyl amines.

3. An enamine resin of claim 2, wherein substantially all hydroxyl groups of the polyol are replaced by acetoacetate groups.

4. An enamine resin of claim 2, wherein only a portion of the hydroxyl groups of the polyol are replaced by acetoacetate groups.

5. An enamine resin of claim 4, wherein the remaining hydroxyl groups are replaced by a saturated monofunctional carboxylic acid ester, unsaturated monofunctional carboxylic acid ester, or a mixture thereof.

6. A resin of claim 2, wherein:
   a) the polyol having 4 or more hydroxyl groups is selected from pentaerythritol, di-trimethylolpropane, di-pentaerithritol, tri-pentaerithritol, sucrose, glucose, mannose, fructose, galactose, raffinose, copolymers of styrene and allyl alcohol, polyglycidol and poly(dimethylpropionic acid).

7. A resin of claim 1, wherein:
   the saturated monofunctional carboxylic acid ester, unsaturated monofunctional carboxylic acid ester, or a mixture thereof is a fatty acid of soybean oil.

8. An enamine resin of claim 2 wherein substantially all of the acetoacetoxy groups are replaced by enamine groups.

9. An enamine resin of claim 2 wherein only a portion of the acetoacetoxy groups are replaced by enamine groups.

10. An enamine resin of claim 8, wherein the $C_1$-$C_{20}$ alkyl amine is butylamine, hexylamine, octylamine, decylamine, dodecylamine, octadecylamine, or a mixture thereof.

11. An enamine resin of claim 9, wherein the $C_1$-$C_{20}$ alkyl amine is butylamine, hexylamine, octylamine, decylamine, dodecylamine, octadecylamine, or a mixture thereof.

12. An enamine resin of claim 5, wherein:
   the polyol having 4 or more hydroxyl groups is selected from pentaerythritol, di-trimethylolpropane, di-pentaerithritol, tri-pentaerithritol, sucrose, glucose, mannose, fructose, galactose, raffinose, copolymers of styrene and allyl alcohol, polyglycidol and poly(dimethylpropionic acid); and
   the saturated monofunctional carboxylic acid ester, unsaturated monofunctional carboxylic acid ester, or a mixture thereof is a vegetable or seed oil carboxylic acid ester; and
   the $C_1$-$C_{20}$ alkyl amine is butylamine, hexylamine, octylamine, decylamine, dodecylamine, octadecylamine, or a mixture thereof.

13. A resin of claim 12, wherein:
   a) the polyol having 4 or more hydroxyl groups is sucrose; and
   b) the saturated monofunctional carboxylic acid ester, unsaturated monofunctional carboxylic acid ester, or a mixture thereof is a fatty acid of soybean oil.

14. A curable coating composition comprising:
   a) a resin of claim 1 or 2,
   b) at least one metallic drier compound, and
   c) optionally, one or more solvents.

15. A curable coating composition comprising:
   a) an acetoacetylated resin of claim 1;
   b) enamine resin which is the reaction product of:
      an acetoacetylated resin, and
      a $C_1$-$C_{20}$ alkyl amine or a mixture of $C_1$-$C_{20}$ alkyl amines, wherein the acetoacetylated resin forming the enamine is the reaction product of:
a polyol having 4 or more hydroxyl groups; and
at least one acetoacetate;
and wherein only a portion of the acetoacetoxy groups are replaced by enamine groups;
c) an poly-functional amine compound having two or more primary amine groups;
d) at least one metallic drier; and
e) optionally one or more solvents.

16. A curable coating composition of claim 15, wherein:
in the acetoacetylated resin a)
the polyol having 4 or more hydroxyl groups is selected from pentaerithritol, di-trimethylolpropane, di-pentaerithritol, tri-pentaerithritol, sucrose, glucose, mannose, fructose, galactose, raffinose, copolymers of styrene and allyl alcohol, polyglycidol and poly(dimethylpropionic acid); and
the saturated monofunctional carboxylic acid ester, unsaturated monofunctional carboxylic acid ester, or a mixture thereof is a vegetable or seed oil carboxylic acid ester; and
in the enamine resin b)
the polyol having 4 or more hydroxyl groups is selected from pentaerithritol, di-trimethylolpropane, di-pentaerithritol, tri-pentaerithritol, sucrose, glucose, mannose, fructose, galactose, raffinose, copolymers of styrene and allyl alcohol, polyglycidol and poly(dimethylpropionic acid); and
the saturated monofunctional carboxylic acid ester, unsaturated monofunctional carboxylic acid ester, or a mixture thereof is a vegetable or seed oil carboxylic acid ester; and
the $C_1$-$C_{20}$ alkyl amine is butylamine, hexylamine, octylamine, decylamine, dodecylamine, octadecylamine, or a mixture thereof.

17. A curable coating composition of claim 16, wherein:
in the acetoacetylated resin a) the polyol having 4 or more hydroxyl groups is sucrose; and the saturated monofunctional carboxylic acid ester, unsaturated monofunctional carboxylic acid ester, or a mixture thereof is a fatty acid of soybean oil; and
in the enamine resin b) the polyol having 4 or more hydroxyl groups is sucrose; and the saturated monofunctional carboxylic acid ester, unsaturated monofunctional carboxylic acid ester, or a mixture thereof is a fatty acid of soybean oil.

18. An article coated with a cured coating composition according to claim 14.

19. An article coated with a cured coating composition according to claims 15.

20. A resin of claim 5, wherein:
the saturated monofunctional carboxylic acid ester, unsaturated monofunctional carboxylic acid ester, or a mixture thereof is a vegetable or seed oil carboxylic acid ester.

* * * * *